United States Patent Office.

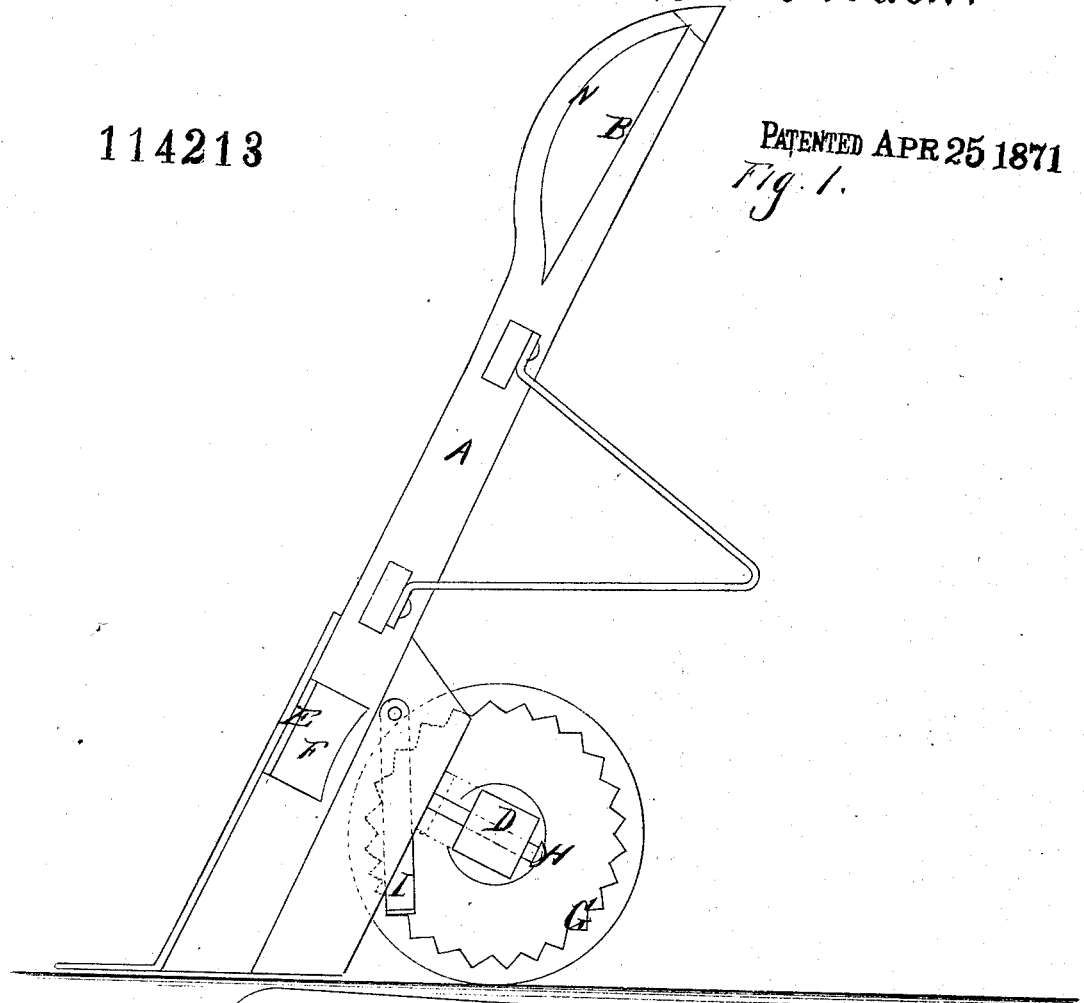
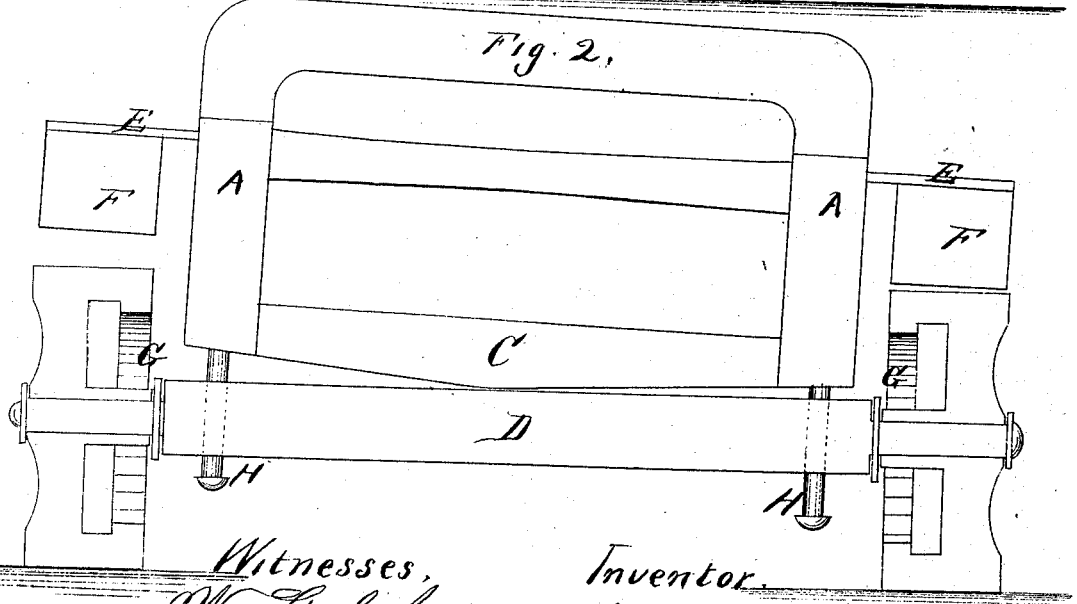

ANDREW V. SMITH, OF SAN FRANCISCO, CALIFORNIA.

Letters Patent No. 114,213, dated April 25, 1871.

IMPROVEMENT IN STORE-TRUCKS.

The Schedule referred to in these Letters Patent and making part of the same.

*To all whom it may concern:*

Be it known that I, ANDREW V. SMITH, of the city and county of San Francisco, State of California, have invented an Improved Store-Truck; and I do hereby declare the following description and accompanying drawing are sufficient to enable any person skilled in the art or science to which it most nearly appertains to make and use my said invention or improvements without further invention or experiment.

The object of my present invention is the construction of an improved truck, such as is used about stores and wharves.

The improvement is more especially adapted to two-wheeled trucks; and

It consists—

First, in a device for holding the truck and preventing its rolling back when the front is depressed to receive or load; and, Secondly, in an arrangement of parts by which the truck can be held at pleasure on an incline.

Referring to the accompanying drawing for a more complete explanation of my invention—

A A are the side frames or rails of the truck having the handles B.

A beam, C, extends across the truck just above the axle D, and its lower side is beveled each way from the center so that the truck may be tipped from side to side, as shown in fig. 2.

From a point near the top of the side timbers arms E E extend out over the wheels and carry the brake-blocks F F, and when the truck is tipped to one side or the other, one of these blocks will be brought into contact with the wheel and stop the truck or check its headway, as in going down a steamboat plank or other incline.

Loose bolts H H pass through the beam C and the axle, and hold the two together, but allow the truck to tip from side to side.

The wheels are so made that they carry ratchet-gears, G, inside their periphery.

A sort of pawl, I, is attached to each side of the truck-frame at such a point that when the truck stands as in fig. 1 the force of gravitation will cause the pawl to fall into contact with the teeth, as shown, and thus hold the wheels from slipping or rather rolling back.

A good leverage can thus be obtained for raising the weight; and when the truck is in position for moving off, the pawls immediately fall away from the ratchet-gears and allow the wheels freedom to move in any direction.

The handles of the truck are made so that a curved hand-hold, N, is formed, which is of a convenient size to be easily grasped by the hand.

A straight bar, P, extends from end to end of a curved handle, N, and the outer ends of the two are clipped or fastened together in some suitable manner. Both the hand-hold N and bar P may be merely a continuation of the side rails A, or they may be made of metal and secured to the rails A, the curved bar giving a convenient-sized handle to grasp, while the straight bar strengthens it.

By this arrangement I have a truck which can be easily stopped on an incline, and one which can be easily loaded with no danger of slipping.

What I claim, and desire to secure by Letters Patent, is—

1. The self-acting brake for a store-truck while loading, consisting of the pawls L and ratchet G, substantially as herein described.

2. Braking a truck or other vehicle by means of the rocking-beam C and the stationary brake-blocks F F, or equivalent device substantially as described.

3. The curved handle N and straight bar P, when employed as a hand-hold on a store-truck, substantially as and for the purpose specified.

In witness whereof I have hereunto set my hand and seal.

ANDREW V. SMITH. [L. S.]

Witnesses:
 WM. GERLACH,
 EUGENE FOLGER,
 JOHN L. BOONE.